May 19, 1959  S. YANDO, JR  2,886,922
METHOD AND APPARATUS FOR BENDING GLASS SHEETS OR PLATES
Filed Feb. 3, 1955  2 Sheets-Sheet 1

INVENTOR.
Steve Yando, Jr.
BY
Nobbe & Swope
ATTORNEYS

May 19, 1959 S. YANDO, JR 2,886,922
METHOD AND APPARATUS FOR BENDING GLASS SHEETS OR PLATES
Filed Feb. 3, 1955 2 Sheets-Sheet 2
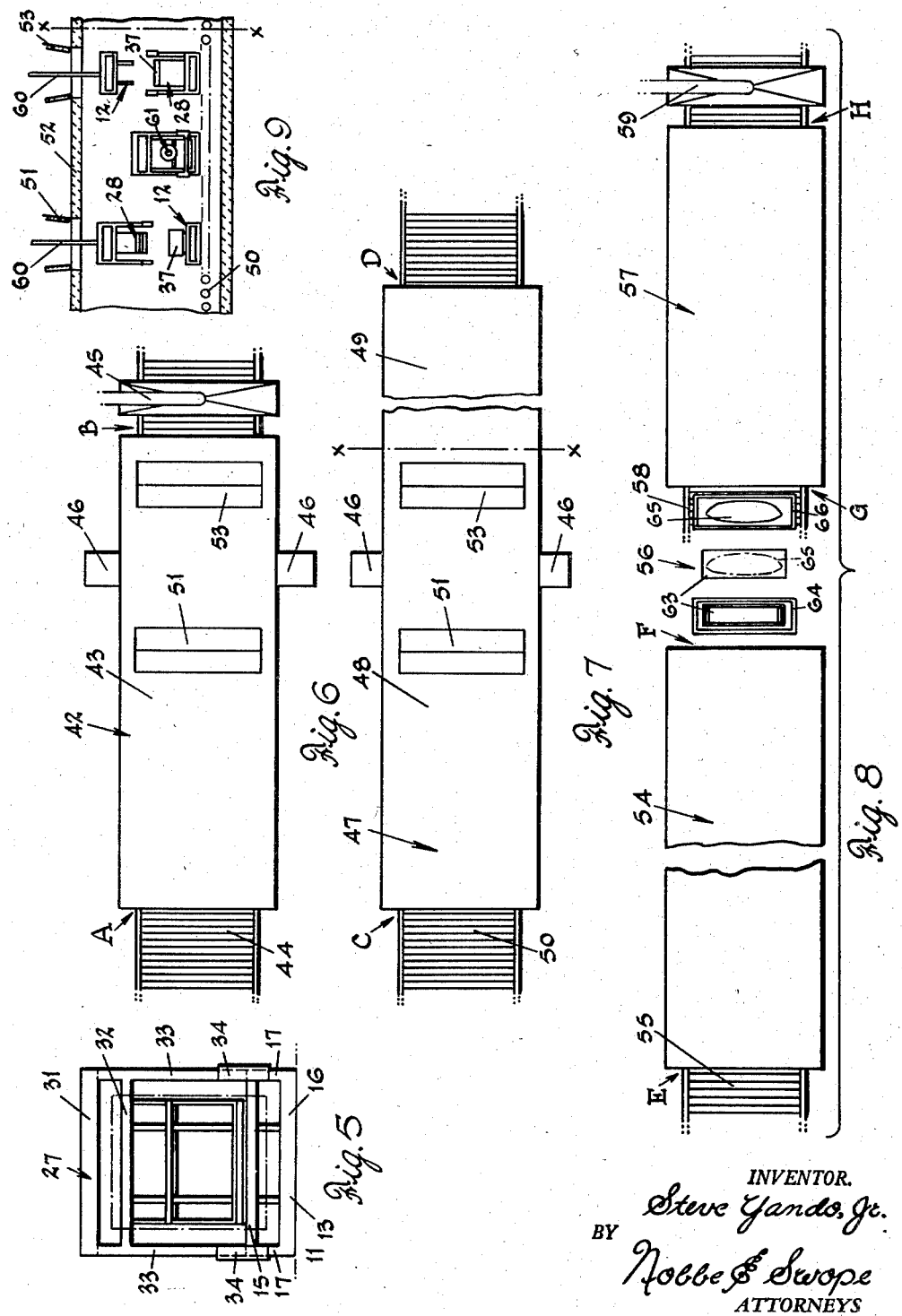
INVENTOR.
Steve Yando, Jr.
BY
Nobbe & Swope
ATTORNEYS United States Patent Office 2,886,922
Patented May 19, 1959

2,886,922

METHOD AND APPARATUS FOR BENDING GLASS SHEETS OR PLATES

Steve Yando, Jr., Perrysburg, Ohio, assignor to Libbey-Owens-Ford Glass Company, Toledo, Ohio, a corporation of Ohio Application February 3, 1955, Serial No. 485,923

8 Claims. (Cl. 49—67)

This invention is generally concerned with the bending of glass sheets or plates, and more particularly with an improved method and apparatus for bending glass sheets of substantial length.

The automobile windshields now in common use, such as the panoramic or hook-type windshields, require the use of flat glass sheets of increased length as compared to prior windshields of relatively shallow curvature. This is equally true with respect to automobile back windows which now are usually of one-piece construction and have extensively curved end portions. The molds commonly used in bending these windshields, and back windows, have a concavely curved shaping surface, and the flat glass sheet to be bent is initially supported at its opposite ends above the shaping surface by suitable supporting means associated with the mold. The mold and sheet are then passed through a furnace in which the sheet is subjected to a temperature such as to cause the glass to soften and bend downwardly into conformity with the shaping surface. During the bending of the sheet, the supporting means exerts pressure upon the opposite ends of the sheet to accelerate the bending.

As the length of the flat sheet to be bent increases, this method of supporting the sheet at its opposite ends upon a concave mold and exerting pressure thereon creates a problem due to the increase in the deflection of the central portion of the sheet. Such an increase in the amount of deflection is undesirable since the central portion of the sheet, when passed through a bending furnace, may contact the shaping surface of the mold before those portions of the sheet outwardly of the central portion are at the proper temperature to conform to their respective portions of the shaping surface. Moreover, there is always a slight deflection in the center of the flat sheet when it is initially supported on the mold due to its normal tendency to act as a beam. Therefore, any force applied to the ends of the sheet will increase the amount of deflection since the central portion of the sheet is eccentric to the applied force. Also, as the distance between the supports for the sheet increases, due to longer sheet lengths, the bending moment developed in the center of the sheet increases, and if the length of the sheet is such that the supports are at a distance sufficient to cause this bending moment to reach a critical value, the glass sheet may break or shatter.

Bending molds which tend to eliminate some of the above-mentioned problems are those of the convex type wherein the shaping surface is convexly curved and the glass sheet is supported thereon substantially at its central portion. However, the use of convex molds, in bending automobile windshields or rear windows, has produced at least one undesirable feature in the glass sheets bent thereon. Namely, the sheet has a "caved-in" appearance when installed in an automobile. This is produced during bending and is caused by the portions of the sheet, inwardly of the mold shaping surface, sagging downwardly. After being bent and mounted in an automobile, a sheet which is bent on a convex mold has its upper surface disposed to the outside and, therefore, has the afore-mentioned undesirable visual defect.

On the other hand, concave molds which produce an arched effect in the bent glass sheet, when installed in an automobile, are not entirely satisfactory in bending sheets of substantial length because of the aforementioned problems involving deflection etc.

Therefore, the principal object of the present invention is to provide an improved method and apparatus for bending glass sheets of substantial length and particularly those having sharply curved end portions.

Another object of the invention is to provide a method and apparatus for bending glass sheets in which advantage is taken of the better features of both convex and concave bending molds.

A further object of the invention is to provide a method of bending glass sheets in which the sheet is initially bent on a mold having a convex shaping surface, and then shaped to its finished curvature upon a mold having a concave shaping surface.

A still further object of the invention is to provide a method of bending glass wherein the sheet is initially bent on a convex shaping surface, then has its upper surface engaged by a concave shaping surface, inverted while retained between the two shaping surfaces, and then bent to final curvature while retained on the concave shaping surface.

Other objects and advantages of the invention will become more apparent during the course of the following description when taken in connection with the accompanying drawings.

In the drawings, wherein like numerals are employed to designate like parts throughout the same:

Fig. 5 is an end view of the two molds shown in Fig. 3;

Fig. 6 is a diagrammatic plan view of a bending furnace used in the production of tempered glass sheets;

Fig. 7 is a diagrammatic plan view of a bending and annealing furnace;

Fig. 8 is a diagrammatic plan view of a bending furnace used in conjunction with a reheating and tempering furnace; and Fig. 9 is a partial longitudinal section along the center line of the bending furnaces shown in Figs. 6 and 7.

Briefly stated, the present invention provides a method of bending glass sheets in which the sheet to be bent is initially supported upon and bent into conformity with a convex shaping surface, after which the upper surface of the bent sheet is engaged by a concave shaping surface which conforms substantially thereto. The bent sheet is then inverted while retained between the two shaping surfaces so that it is supported upon the concave shaping surface, and the sheet is then annealed or tempered while supported on the concave shaping surface. In such a method, initial bending of the sheet takes place upon the convex shaping surface while the sheet is shaped to its finished curvature upon the concave shaping surface.

Figure 1:
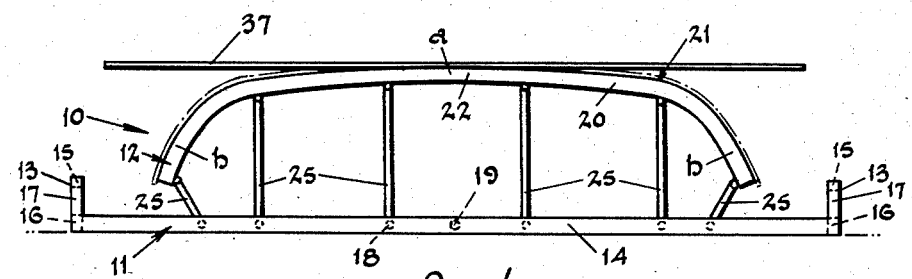
Fig. 1 is a side elevation view of a convex mold having a glass sheet to be bent supported thereon.

With reference now to the drawings, and particularly to Fig. 1, a portion of the bending apparatus herein provided for carrying out the method of the invention is generally designated by the numeral 10, and comprises a rack 11 upon which is supported a male or convex bending mold 12.

The rack 11 comprises an open substantially rectangular framework having opposite end sections 13 rigidly connected to one another by longitudinally disposed side rails 14. As seen in Figs. 1 and 5, the end sections 13 comprise spaced end bars 15 and 16 joined together by vertical members 17 which, at their lower ends, are joined to the side rails 14. Arranged transversely between the side rails 14 are a plurality of spaced support rods 18, and a lift bar 19 with which, as later described, the mold may be handled.

The mold 12 includes a continuous rail 20 having a shaping surface 21 formed on the upper surface thereof and which comprises a pair of spaced parallel side rails 22 having a relatively shallow curvature in their central portions $a$ and downwardly directed comparatively sharply curved end portions $b$. To complete the rail 20, the side rails 22 are connected to one another at their opposite ends by transversely disposed end rails 23. To support the rail 20 and to impart rigidity thereto, a plurality of spaced cross rods 24 may be secured to the undersides of the side rails 22 and said rods, in turn, supported at the upper ends of vertical members 25 having their lower ends seated on the support rods 18 inwardly of the rack side rails 14.

Figure 2:
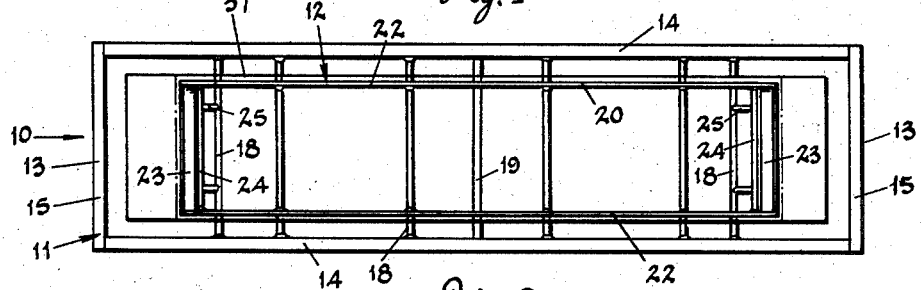
Fig. 2 is a plan view of the molds shown in Fig. 1.
Figure 3:
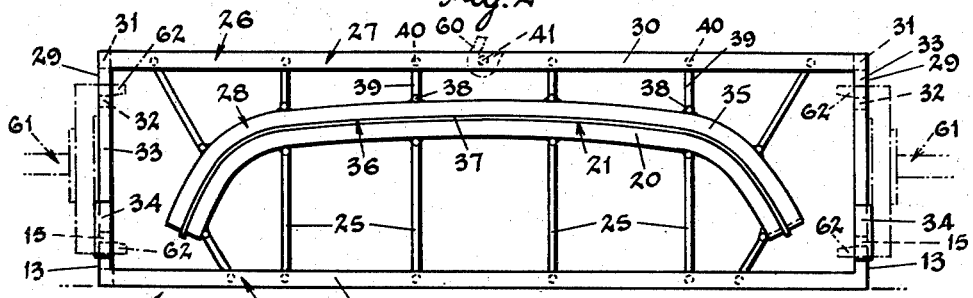
Fig. 3 is a side elevation view of the convex mold after the glass sheet has been bent thereon and with a concave mold positioned above the glass sheet and engaging the upper surface thereof.
Figure 4:
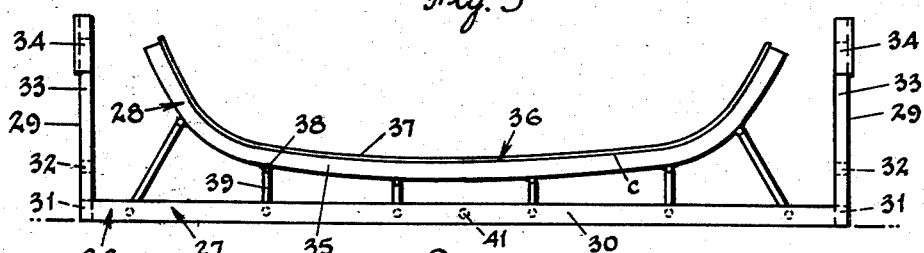
Fig. 4 is a side elevation of the concave mold of Fig. 3 in inverted position and with the bent glass sheet supported thereon.

In Fig. 3 is illustrated another bending apparatus 26 which is employed with the mold shown in Figs. 1 and 2 in carrying out the method of this invention. The apparatus 26 comprises a rack 27 and a female or concave bending mold 28. The rack 27 is rectangular in shape and comprises end sections 29 joined to one another by longitudinal side rails 30. As seen in Fig. 5, each of the end sections 29 comprises spaced transverse bars 31 and 32 terminating in vertical members 33 which, at their upper ends, are joined to the side rails 30. The opposite end of each of the members 33 extends downwardly beyond the side bars 32 and is capped with an angle 34 which extends beyond the end of said member.

The mold 28 is similar in plan view (Fig. 2) to the mold 12 and has a continuous rail 35 having a shaping surface 36 formed on the lower edge thereof which conforms to the curvature of the shaping surface 21 of the rail 20. As seen in Figs. 2 and 3, and as will be later described, the matching shaping surfaces 21 and 36 are substantially rectangular in plan view and coact to grip a block size glass sheet 37 therebetween to properly effect the bending of the same.

The continuous rail 35 has a supporting structure similar to that of the mold 12 connecting it to the rack 27. This supporting structure comprises a plurality of rods and bars 38, 39 and 40, which correspond to the respective members 24, 25 and 18 of the mold 12. As a means of handling the mold, a lift bar 41 is provided between the side rails of the rack 27.

Figs. 6 to 8 show, in diagrammatic form, various types of furnaces which have been adapted to perform the invention. The furnace 42 shown in Fig. 6 is adapted to both bend and temper glass sheets and comprises a heating section 43 having a charge end A and a discharge end B. A conveyor 44 is provided for conveying molds through the furnace and an air hood 45 is provided over the conveyor 44 outwardly of the discharge end of the heating chamber for tempering the bent sheets as they leave the furnace. As will be later described, means is provided for inverting the molds while they are within the frame and when they are in the position shown in Fig. 3. This means is housed within cubicles 46 extending outwardly from the furnace adjacent the discharge end thereof.

As shown in Fig. 7, the furnace 47 is of the general type known as a continuous bending and annealing furnace and comprises a bending section 48 and a connected annealing section 49, the division point therebetween being indicated by the phantom line $x$—$x$. Outwardly extending cubicles 46 are provided in the bending section for housing the mold inverting means, and a conveyor 50 extends through the furnace for bearing molds into the charge end C and out the discharge end D.

The partial longitudinal cross section shown in Fig. 9 applies to each of the furnaces 42 and 47 shown in Figs. 6 and 7. As there shown, a trap door arrangement 51 is provided in the furnace roof 52 immediately ahead of the cubicles 46 over the furnace conveyor, and a similar trap door arrangement 53 is provided in the roof immediately after the cubicles. As will be later described, these doors permit the concave mold 28 to be lowered into the furnace on top of the mold 12, and after the molds are inverted, the mold 12 may then be removed from the furnace.

The furnace system shown in Fig. 8 may be used in producing pattern cut tempered glass sheets. This system includes a bending furnace 54 having a charge end E and a discharge end F. A conveyor 55 is provided for conveying molds through the furnace. A sheet handling and cutting station 56 is provided at the discharge end F of the furnace 54 and immediately adjacent thereto is a reheat furnace 57 which has a conveyor 58 for bearing molds into the charge end G thereof and out the discharge end H and then beneath a tempering hood 59.

In describing how the method of the invention may be best performed, the male mold 12 will be referred to as the convex shaping surface, and the female mold 28 will be referred to as the concave shaping surface.

According to the invention, the glass sheet 37 to be bent is positioned upon the convex shaping surface and, as shown in Fig. 1, is supported by said shaping surface substantially at its midpoint. In a bending and annealing operation, the convex shaping surface having the sheet 37 thereon is placed on the conveyor 50 and passed through the charge end C of the bending and annealing furnace 47. Upon passage through the furnace, the glass sheet is subjected to sufficient heat in the bending zone 48 so as to cause the sheet portions outwardly of the midpoint to sag downwardly and bend into conformity with said shaping surface. In its passage through the furnace 47 and, as shown in Fig. 9, the sheet 37 is bent prior to arriving beneath the trap door arrangement 51 in the furnace roof 52. When the convex shaping surface bearing the now bent sheet is beneath the trap doors, the doors are opened and the concave shaping surface, which may be supported by a hook 60 and preferably heated to the temperature of the bent sheet, is lowered therethrough. When so lowered, and as seen in Figs. 3 and 5, the angles 34 of the rack 27 engage the uprights 17 of the rack 11, and guide the concave shaping surface into contact with the bent glass sheet 37. With the concave shaping surface in place and engaging the upper surface of the bent sheet, the pressure created upon the marginal portions of the sheet which is maintained at bending temperature, due to the weight of said shaping surface, causes those portions to accurately conform to the curvature of the convex shaping surface. The two shaping surfaces, having the sheet 37 therebetween, are then advanced forwardly in the furnace a limited distance until they arrive opposite the cubicles 46 which house the means for inverting the molds.

It was previously mentioned in connection with the bending of automotive windshields and back windows on a convex mold, that the sag in the bent sheet will give a "caved-in" effect to the sheet when installed in an automobile. To avoid this objectionable feature, and in carrying out the invention, the two shaping surfaces having the glass sheet 37 therebetween are inverted while the sheet is substantially at bending temperature so that the sheet is then supported upon the concave shaping surface and receives its finished contour when supported by said shaping surface. When supported upon the concave shaping surface, the sag in the sheet is reversed; that is, gravity acting upon the sheet, which is still preferably maintained at substantially bending temperature, causes the central portion of the sheet to deflect downwardly a limited distance. Then, when the sheet is subsequently cooled and installed in an automobile, the under surface c is disposed toward the outside and will have a slightly arched appearance which is pleasing to the eye.

As shown in Fig. 3, in phantom lines, the means for inverting the shaping surfaces may comprise a pair of rotatable jaws 61 each of which having inwardly directed beveled end portions 62. When the shaping surfaces arrive opposite the cubicles 46, the jaws are moved inwardly toward the supporting racks and the beveled end portions 62 engage the side bars 15 and 32 of the respective rack end sections 13 and 29 and act in such a manner as to tightly clamp said end sections to one another. When so clamped, the jaws, which may be supplied with a suitable source of rotative power, are rotated 180 degrees thereby inverting the shaping surfaces so that the convex shaping surface is now on top and the concave shaping surface is beneath and supports the bent glass sheet 37. During rotation, due to the clamping action of the jaws on the racks, the shaping surfaces exert a continuing pressure on the marginal area of the glass sheet clamped therebetween so that there is no danger of the sheet slipping.

After the shaping surfaces have been thus inverted, the convex shaping surface is no longer needed and may be immediately disengaged from the glass sheet or, as shown in Fig. 9, the two surfaces having the sheet therebetween may be advanced a further limited distance in the furnace until they are beneath the second trap door arrangement 52. The doors thereof are then opened and the hook 60 may be lowered to lift the convex shaping surface from engagement with the bent sheet and remove said shaping surface from the furnace. The concave shaping surface now bearing the sheet is then advanced through the remainder of the furnace bending zone and then through the annealing zone wherein the sheet is slowly cooled. In passing through the balance of the bending zone, the sheet accurately conforms itself to the concave shaping surface if it has not already done so, and the reverse sag in the central portions, if not effected during the inverting step or shortly thereafter, then is accomplished.

It will be understood, of course, that the terms bending and annealing zones are relative and do not in most cases actually embody a physical change in the furnace but rather a change of temperature. As shown in Fig. 9, the inverting of the shaping surfaces takes place within the bending zone 48 of the furnace 47. In the method of the invention, the inverting of the shaping surfaces may take place at any time before the sheet has reached the temperature at which it will retain its final bent shape if left unsupported provided, however, that the sheet is sufficiently hot to enable the reverse sag of the central portion to take place when the sheet is supported by the concave shaping surface.

In tempering glass sheets bent in accordance with the invention, the furnace 42 shown in Fig. 6 may be used. In this furnace, the glass sheet is placed on a convex shaping surface which is then conveyed through the furnace and through the bending zone thereof. After the sheet is bent, the upper surface thereof is then engaged with the concave shaping surface, the two shaping surfaces inverted, and the convex shaping surface then withdrawn from contact with the bent sheet since it no longer serves an essential purpose. While the sheet is still maintained at substantially bending temperature and supported by the concave shaping surface so that the central portion thereof sags downwardly, it emerges from the discharge end B of the furnace and passes beneath the air hood 45. While thereunder, the sheet is subjected to a blast of air which effects the case hardening or tempering of the now bent sheet.

The furnace system shown in Fig. 8 is used for performing the method of the invention when it is desired to perform the inverting step outwardly of a bending furnace. A block size glass sheet 63 to be bent is supported upon a convex shaping surface 64 and placed on the conveyor 55 whereby it is passed through the furnace 54 and bent into conformity with said shaping surface. Upon emerging from the discharge end F of the furnace, the sheet 63, which need only be cool enough to be handled, is removed from the shaping surface 64 and a patterned sheet 65 cut therefrom. The pattern cut sheet is then inverted into concave position and placed on a concave shaping surface 66 having a contour which matches the sheet. The shaping surface 66 is passed into the reheat furnace 57 and the sheet 65 reheated to bending temperature. At such temperature the reverse sag of the central portion of the sheet takes place. While being maintained at sufficient temperature for tempering, the sheet emerges from the discharge end H of the furnace and passes beneath the air hood 59 which directs a blast of air at the sheet to effect the tempering of the same. However, it will be understood, that the tempering hood 59 could be omitted and that the sheet could then be passed through an annealing furnace to produce an annealed bent sheet.

Although the bending molds hereinbefore described are of the type on which block size glass sheets are bent, it will be appreciated that these molds could be of the type used in bending pattern cut sheets, and that either block size or pattern cut sheets may be bent by the novel method herein disclosed.

It is to be understood that the form of the invention herewith shown and described is to be taken as a preferred embodiment of the same, and various changes may be resorted to without departing from the spirit of the invention or the scope of the subjoined claims.

I claim:
1. A method of bending glass sheets, which comprises heating a sheet to be bent and bending the under surface thereof into conformity with a skeleton type convex shaping surface in the absence of pressure applied to the central sheet portion, inverting the bent sheet and supporting it on a skeleton type concave shaping surface, and then shaping the sheet to finished curvature on said concave shaping surface.

2. A method of bending glass sheets, which comprises heating a sheet to be bent to bending temperature, bending said sheet into conformity with a skeleton type convex shaping surface in the absence of pressure applied to the central sheet portion, inverting the bent sheet and depositing it on a skeleton type concave shaping surface while maintaining said sheet substantially at bending temperature, and then cooling said sheet.

3. A method of bending glass sheets, which comprises the steps of bending a sheet into conformity with a skeleton type convex shaping surface in the absence of pressure applied to the central sheet portion, engaging only the marginal surface of the bent sheet with a skeleton type concave shaping surface having a curvature which conforms substantially to the curvature of said convex shaping surface, inverting the two shaping surfaces, and maintaining the sheet at bending temperature while shaping the sheet to finished curvature on said concave shaping surface.

4. A method of bending glass sheets, which comprises the steps of heating and bending a sheet into contact with a skeleton type convex shaping surface in the absence of pressure applied to the central sheet portion, applying pressure only to the marginal surface of said sheet while retaining it on said convex shaping surface to better conform said sheet to said shaping surface, cooling said sheet, before the sheet has cooled to a temperature at which it will retain its bent shape if left unsupported inverting said sheet and depositing it on a skeleton type concave shaping surface having a curvature which substantially matches the curvature of the convex shaping surface and shaping the sheet to final curvature on said concave shaping surface.

5. A method of bending glass sheets, which comprises the steps of supporting a glass sheet to be bent on a skeleton type convex shaping surface, heating the sheet to bending temperature and bending it into conformity with said shaping surface in the absence of pressure applied to the central sheet portion, removing the bent sheet from the convex shaping surface, inverting said sheet to deposit it on a skeleton type concave shaping surface, and then reheating the bent sheet to bending temperature while supporting it on said concave shaping surface to impart a finished curvature to said sheet.

6. In apparatus for bending glass sheets, in combination, a bending furnace having a charge opening and a discharge opening and an intermediate opening between said charge and discharge openings, a convex shaping surface mounted for movement through said charge opening and past said intermediate opening and having supported thereon a glass sheet to be bent, a concave shaping surface initially positioned outwardly of said furnace, means for moving said concave shaping surface through the intermediate furnace opening and into contact with the surface of the glass sheet when the convex shaping surface is adjacent said intermediate opening, and means mounted along the path of movement of said convex shaping surface beyond said intermediate opening for inverting said shaping surfaces so that the glass sheet is supported by the concave shaping surface.

7. Apparatus for bending glass sheets as defined in claim 6, wherein the furnace has a mold removal opening adjacent the path of movement of the convex mold beyond the inverting means, and means for removing the convex shaping surface from the furnace through said removal opening.

8. In apparatus for bending glass sheets, in combination, a bending furnace having a charge opening a discharge opening and a mold removal opening, a convex shaping surface mounted for movement through said charge opening and having supported thereon a glass sheet to be bent, a concave shaping surface initially positioned outwardly of the path of movement of the convex shaping surface through the furnace, means for moving said concave shaping surface into contact with the surface of the glass sheet, means mounted along the path of movement of said convex shaping surface between the charge and mold removal openings for inverting said shaping surfaces so that the glass sheet is supported by the concave shaping surface, and means for removing the convex shaping surface from the furnace through said mold removal opening.

References Cited in the file of this patent
UNITED STATES PATENTS

| | | |
|---|---|---|
| 1,595,139 | Blount | Aug. 10, 1926 |
| 1,779,435 | Kaier | Oct. 28, 1930 |
| 2,104,673 | Rieser | Jan. 4, 1938 |
| 2,131,873 | Goodwillie | Oct. 4, 1938 |
| 2,526,359 | Jendrisak | Oct. 17, 1950 |
| 2,551,311 | Batchell | May 1, 1951 |
| 2,570,309 | Black | Oct. 9, 1951 |
| 2,620,174 | Passafaro | Dec. 2, 1952 |